US010604661B2

(12) United States Patent
Moens

(10) Patent No.: US 10,604,661 B2
(45) Date of Patent: Mar. 31, 2020

(54) POWDER COMPOSITION

(71) Applicant: Allnex Belgium S.A., Drogenbos (BE)

(72) Inventor: Luc Moens, Sint-Genesius-Rode (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 79 days.

(21) Appl. No.: 15/374,017

(22) Filed: Dec. 9, 2016

(65) Prior Publication Data

US 2017/0088716 A1  Mar. 30, 2017

Related U.S. Application Data

(63) Continuation of application No. 12/864,548, filed as application No. PCT/EP2009/051064 on Jan. 30, 2009, now abandoned.

(30) Foreign Application Priority Data

Jan. 31, 2008  (EP) .................... 08101156

(51) Int. Cl.
| C09D 167/02 | (2006.01) |
| B65D 1/12   | (2006.01) |
| B65D 25/14  | (2006.01) |
| B65D 25/34  | (2006.01) |
| C09D 5/03   | (2006.01) |
| C08L 63/00  | (2006.01) |
| C08K 5/20   | (2006.01) |
| C08L 67/02  | (2006.01) |

(52) U.S. Cl.
CPC .............. C09D 5/03 (2013.01); B65D 1/12 (2013.01); B65D 25/14 (2013.01); B65D 25/34 (2013.01); C09D 167/02 (2013.01); C08K 5/20 (2013.01); C08L 63/00 (2013.01); C08L 67/02 (2013.01); C08L 2205/02 (2013.01); Y10T 428/1355 (2015.01)

(58) Field of Classification Search
CPC .... C08G 63/20; C09D 167/00; C09D 167/02; C09D 167/08; C08L 2205/02; C08L 67/00; Y10S 525/934; C08K 5/0025; C08K 5/20
USPC .............. 524/539, 449; 428/35.8, 482, 413; 525/444, 438, 437, 461; 427/388.1, 427/385.5, 458
See application file for complete search history.

(56) References Cited

U.S. PATENT DOCUMENTS

| 4,007,144 A | 2/1977 | Sanders et al. |
| 4,065,438 A | 12/1977 | Verborgt |
| 4,076,917 A | 2/1978 | Swift et al. |
| 4,286,021 A | 8/1981 | Brendley, Jr. |
| 4,340,698 A * | 7/1982 | De Jongh ............ C08G 59/686 |
| | | 525/438 |
| 4,727,111 A | 2/1988 | Pettit, Jr. et al. |
| 4,788,255 A | 11/1988 | Pettit, Jr. et al. |
| 4,824,909 A | 4/1989 | Togo et al. |
| 4,957,814 A | 9/1990 | Barbee et al. |
| 5,104,465 A * | 4/1992 | McAuliffe ............... C22C 21/06 |
| | | 148/437 |
| 5,153,252 A | 10/1992 | Skora |
| 5,397,641 A | 3/1995 | Moens et al. |
| 5,439,988 A | 8/1995 | Moens et al. |
| 5,554,701 A | 9/1996 | Chang et al. |
| 6,413,648 B1 * | 7/2002 | Heyenk ................ C09D 167/00 |
| | | 428/482 |
| 6,635,721 B1 * | 10/2003 | Moens ................. C09D 167/00 |
| | | 525/438 |
| 6,660,398 B1 * | 12/2003 | Moens ................. C09D 167/00 |
| | | 428/482 |
| 2001/0047062 A1 | 11/2001 | Zhou et al. |
| 2004/0014855 A1 | 1/2004 | Wenning |
| 2005/0171256 A1 | 8/2005 | Belder et al. |
| 2005/0171300 A1 | 8/2005 | Moens et al. |
| 2006/0166001 A1 | 7/2006 | Moens et al. |
| 2007/0225396 A1 | 9/2007 | Moens et al. |
| 2010/0016503 A1 | 1/2010 | Urmanova et al. |
| 2018/0223126 A1 * | 8/2018 | Beccaria ............... C09D 167/02 |

FOREIGN PATENT DOCUMENTS

| DE | 24 11 465 | 2/1976 |
| DE | 40 12 020 | 2/1991 |
| EP | 0 322 834 | 7/1989 |
| EP | 0 473 380 | 3/1992 |
| EP | 0 636 669 | 4/1999 |
| EP | 1 067 159 | 1/2001 |

(Continued)

OTHER PUBLICATIONS

Interlocutory Opposition Decision issued Feb. 6, 2017 in corresponding European Application No. 09 705 632.9.
Appendix A entitled "Acid values," submitted with the Notice of Opposition filed Aug. 13, 2014 (cited in item CL in the IDS dated Dec. 9, 2016).
Translation of "indice d'acide" from the online French-English Dictionary, printed on Nov. 17, 2016.

(Continued)

*Primary Examiner* — Lee E Sanderson
(74) *Attorney, Agent, or Firm* — Wenderoth, Link & Ponack, L.L.P.

(57) ABSTRACT

There is described a powder coating composition suitable for food contact use comprising a mix of: (A) a first polyester that is amorphous and COOH functional being obtained from IPA and/or TPA and no more than 10 mole % neopentyl glycol (NPG); (B) a second optional COOH functional polyester obtained from analiphatic diacid and analiphatic diol, and (C) a curing agent that comprises functional groups reactable with the COOH of the polyester(s). The powders are suitable for coating the interior of metal cans especially those holding alcoholic beverages.

23 Claims, No Drawings

(56) References Cited

FOREIGN PATENT DOCUMENTS

| | | |
|---|---|---|
| EP | 0 649 890 | 8/2001 |
| EP | 0 980 901 | 11/2004 |
| EP | 1 726 621 | 11/2006 |
| EP | 2 085 440 | 8/2009 |
| FR | 2 339 635 | 8/1977 |
| JP | 52-94397 | 8/1977 |
| JP | 56-47457 | 4/1981 |
| JP | 62-240369 | 10/1987 |
| JP | 01-98672 | 4/1989 |
| JP | 01-313573 | 12/1989 |
| JP | 04-504733 | 8/1992 |
| JP | 5-509346 | 12/1993 |
| JP | 1995-018169 | 1/1995 |
| JP | 08-311395 | 11/1996 |
| JP | 1996-311395 | 11/1996 |
| JP | 08-337664 | 12/1996 |
| JP | 09-151338 | 6/1997 |
| JP | 11-12537 | 1/1999 |
| JP | 11-152444 | 6/1999 |
| JP | 11-506156 | 6/1999 |
| JP | 11-228676 | 8/1999 |
| JP | 2000-501441 | 2/2000 |
| JP | 2001-200201 | 7/2001 |
| JP | 2003-504452 | 2/2003 |
| JP | 2003-176447 | 6/2003 |
| JP | 2004-516357 | 6/2004 |
| JP | 2007-177235 | 7/2007 |
| WO | 90/12827 | 11/1990 |
| WO | 1991/01748 | 2/1991 |
| WO | 92/01756 | 2/1992 |
| WO | 97/20895 | 6/1997 |
| WO | 97/30131 | 8/1997 |
| WO | 2000/55268 | 9/2000 |
| WO | 01/02505 | 1/2001 |
| WO | WO-0102505 A1 * 1/2001 | ........... C09D 167/00 |
| WO | 02/50201 | 6/2002 |
| WO | 02/055620 | 7/2002 |
| WO | 2003/082996 | 10/2003 |
| WO | 2004/000958 | 12/2003 |
| WO | 2004/013240 | 2/2004 |
| WO | 2006/125545 | 11/2006 |
| WO | WO-2006125545 A1 * 11/2006 | ............. C08L 67/02 |
| WO | 2008/000471 | 1/2008 |

OTHER PUBLICATIONS

Darwin P. R. Kint et al., "Structural Characterization and Thermal Properties of Poly(ethylene terephthalate) Copolymers Containing 2-Butyl-2-ethyl-1,3-propanediol", Journal of Applied Polymer Science, vol. 86, (2002) pp. 1077-1086.
Niyazi Bicak et al., "Self-Curable Polyester by a Reaction of Glycidol with Maleic Anhydride", Journal of Polymer Science: Part A: Polymer Chemistry, 2003, vol. 41, pp. 2549-2555.
Anna Finne et al., "New Functionalized Polyesters to Achieve Controlled Architectures", Journal of Polymer Science: Part A: Polymer Chemistry, 2004, vol. 42, pp. 444-452.
International Search Report of PCT/EP2009/051064; dated Jun. 5, 2009.
Pourreau, Daniel B. et al., "Polyester Resins: Bang for the Buck," Modern Paint & Coatings, 1999 pp. 1-4.
Carl J. Sullivan, "High Performance Polyester Coating Systems: Introduction of 2-Methyl-1,3-Propanediol", presented at XXII FATIPEC Congress, May 1994, 16 pages.
Robert R. Engelhardt, "Carboxyl Functional Polyesters for Powder Coatings", Water-Bourne & Higher Solids, and Powder Coatings Symposium, New Orleans, LA, USA, Feb. 24-26, 1993, pp. 549-561.
Code of Federal Regulation, Food and Drugs, 21, Part 170 to 1999, Apr. 1, 2000, pp. 3, 158-163, 170 and 171.
Inventory of Effective Food Contact Substances (FCS) Notifications, FCN No. 256, EMS Chemie AG/EMS Primid, Oct. 19, 2002.
M. Soccio et al., "Poly(propylene isophthalate, Poly(propylene succinate), and Their Random Copolymers: Synthesis and Thermal Properties", Journal of Polymer Science Part II: Polymer Physics, vol. 45, 2007, pp. 310-321.
Bieleman (Additives for coatings, WILEY-VCH, (2000), p. 169).
BLC701—Ningbo South Sea Chemical Co., Ltd.
English translation of Office Action dated Nov. 27, 2014 in Japanese Application No. 2010-544707.
English translation of Third Party Observations filed Sep. 29, 2014 in Japanese Application No. 2010-544707.
Opposition to EP 2247679 (Patentee Allnex Belgium, S.A.) by PPG Industries, Inc. (Opponent), filed Aug. 13, 2014.
BYK®-361 N for Powder—BYK: Additive Guide.
International Search Report dated Sep. 30, 2009 in International (PCT) Application No. PCT/EP2009/051045.

* cited by examiner

POWDER COMPOSITION

The present invention relates to certain thermosetting powder compositions that are particularly useful in food contact applications.

Thermosetting powder compositions are widely used to prepare paint or varnish coatings for articles such as domestic electrical appliances and automobile industry accessories. These powder generally contain a thermosetting organic binder, fillers, pigments, catalysts and various additives used to adapt their properties to their intended use.

Typical binders used to prepare such thermosetting powder paints contain either a mixture of carboxyl group-containing polymers, (such as a carboxyl group-containing polyester or polyacrylate, and epoxy compounds, such as triglycidyl isocyanurate, glycidyl group-containing acrylic copolymers or (3-hydroxyalkylamides) or a mixture of hydroxyl group-containing polymers (such as hydroxyl-containing polyesters, with blocked or non-blocked isocyanates or melamine resins). These polyesters are usually prepared from aromatic dicarboxylic acids, mainly terephthalic acid and isophthalic acid and optionally a minor proportion of aliphatic or cycloaliphatic dicarboxylic acids, and from various polyols mainly neopentyl glycol and optionally a minor proportion of other aliphatic or cycloaliphatic polyols such as ethyleneglycol, 1,6-hexanediol or trimethylolpropane.

These polyesters generally contain a high proportion (typically >85% by weight on polyols) of NPG to improve the film forming ability of the resultant polyester and the powder composition containing it.

When such thermosetting binders are formulated with an appropriate crosslinking agent they can produce paint and varnish coatings with good appearance, impact resistance and flexibility.

The inner surfaces of food containers are often coated to retard or eliminate interactions between the food and its container. This is particularly important where the food container comprises metal, for example metal cans that contain beverages. It is desirable to use powder coatings for such an application.

However thermosetting powders formulated for paints and varnishes contain extractable compounds which are unsuitable for food contact applications. For example aromatic dicarboxylic acids, bisphenol-A and aromatic glycidyl ethers may be harmful if ingested. If a coating is to come into contact with alcohol it should be substantially free of neopentyl glycol (NPG).

As used herein the term "food" means any ingredient(s) or product which is intended to be ingested internally by humans or animals (preferably humans) such as foodstuffs, beverages, pharmaceuticals, medicaments and the like. Beverages may be alcoholic or non alcoholic beverages. A food contact application is any use of a coating where the coating is intended or likely to come into prolonged contact with food.

Preferred coatings suitable for use in food contact applications will have some or all of the following properties. The coating should adhere well to the interior of the container and possess sufficient chemical resistance to avoid the coating (or any components) reacting with or leaching into the food contents in such a manner to adversely affect them. As the coating may be applied to a sheet or roll before it forms a container, the coating must also be sufficiently flexible to survive methods such as die cutting and pressing that may be used to produce the final container. A suitable powder coating may also be able to be used on closures, can ends and on can, drum or container exteriors and interiors in direct contact with food and alcoholic and non-alcoholic beverages. The coating may also be able to be used to protect the seams of a container (for example in three piece cans used in the food industry). Coatings that are suitable for prolonged contact with food, preferably should satisfy the relevant, legal, environmental and other regulations that govern such contact. A secondary problem is to provide coatings suitable for food contact that also exhibit improved resistance to alcohol and so are particularly suitable for coating the interior of food containers that will come into contact with alcohol (e.g. where the container holds alcoholic beverages or where alcohol is used to clean or recycle the container before use).

Prior art powder coating formulations prepared for other uses (such as binders for paints and varnishes) contain ingredients unsuitable for food contact use. It has been believed that such ingredients were necessary so the powder formulations will have the desired mechanical properties when applied as a coating.

WO 2004/013240 describes NPG free polyester resins as part of a binder for liquid thermosetting coating systems, that are intended for use in food contact applications. The binder comprises a polyester resin with $T_g$<50° C. and a crosslinker. Optionally the binder may be a polyester blend of 60 to 90% by weight of a polyester of $T_g$<50° C. and 10 to 40% by weight of a polyester $T_g$>50° C. The polyesters are described as having a number average molecular weight of 5000 to 20000; an acid number of <5 mg KOH/g and a hydroxyl number of <20 mg KOH/g. The exemplified polyesters are each prepared from reacting terephthalic and isophthalic acid with a polyol mixture of 2-methyl 1,3-propanediol, ethyleneglycol and 1,4-cyclohexanedimethanol.

WO 2000/55268 discloses powder coating metal substrates for food contact applications where the powder comprises a thermoplastic material of 50 to 100% by weight of a polyester blend of a polyethylene terephthalate, a polybutylene terephthalate, a polyethylene naphthanate, a copolyester, a polytrimethylene terephthalate, and/or polytrimethylene naphthanate where one of these polyesters has a weight average molecular weight from 1,000 to 80,000 and $T_g$ from 45° C. to 100° C. and a second of these polyesters has weight average molecular weight from 1,000 to 70,000 and $T_g$ from −10° C. to 45° C.; together with from 0 to 25% by weight of a modifying resin selected from epoxy, phenoxy, acrylic and/or polyolefin resin.

None of these prior art formulations is entirely satisfactory for food coating applications (for example they have unsatisfactory mechanical properties). Also the powder coating composition exemplified in DE 2411465 would not be satisfactory for such applications.

It is an object of the invention to solve some or all of the problems described herein. A more preferred object of the invention is to provide powder coatings that may be used on the interior surfaces of a container intended to hold food and retain the desired mechanical and other properties described herein. A still more preferred object of the invention is to provide a powder coating that may be used to coat the interior of a metal food container such as a metal can. A most preferred object of the invention is to provide powder coatings that are suitable for food contact and also exhibit improved resistance to alcohol and so are particularly suitable for coating the interior of food containers that will come into contact with alcohol (such as those that will hold alcoholic beverages).

Broadly in accordance with the present invention there is provided a powder coating composition comprising as a binder a mixture of:

(A) a first polyester that is amorphous and comprises at least one carboxy group; the first polyester being obtained from an acid comprising at least 50 mole % (by total moles of polyacid) of isophthalic acid and/or terephthalic acid and from a polyol which comprises no more than 10 mole % (by total moles of polyol) of neopentyl glycol (NPG);

(B) a second optional polyester that comprises at least one carboxy group; the second polyester being obtained from an aliphatic diacid and an aliphatic diol, and (C) a curing agent that comprises functional groups reactable with the carboxylic acid groups on the polyester(s) (A) and (where present) (B).

There is further provided a powder coating composition comprising as a binder a mixture of:

(A) a first polyester that is amorphous and that comprises at least one carboxy group; the first polyester being obtained from an acid comprising at least 50 mole % (by total moles of polyacid) of isophthalic acid and/or terephthalic acid, and from a polyol which comprises no more than 10 mole % (by total moles of polyol) of neopentyl glycol (NPG);

(B) a second polyester that comprises at least one carboxy group; the second polyester being obtained from an aliphatic diacid and an aliphatic diol, more preferably from a linear aliphatic diacid and from a non-linear aliphatic diol; and (C) a curing agent that comprises functional groups reactable with the carboxylic acid groups on the polyester(s) (A) and (B).

Advantageously the first polyester has an acid number from 15 to 100 mg KOH/g, preferably from 20 to 80 mg KOH/g, more preferably from 25 to 80 mg KOH/g, most preferably from 30 to 70 mg KOH/g.

Advantageously in any of the disclosed compositions the second polyester (B) is amorphous. Advantageously a (any) binder herein disclosed consists essentially of amorphous polyesters, more in particular amorphous polyesters comprising at least one carboxy group. Hereby is meant that a (any) binder herein disclosed advantageously comprises less than 3, less than 2, preferably less than 1, more preferably less than 0.5 parts by weight, calculated on the total of polyesters, of semi-crystalline polyesters, more in particular semi-crystalline polyesters comprising at least one carboxy group. Advantageously, a (any) binder herein disclosed is free from semi-crystalline polyesters, more in particular semi-crystalline polyesters comprising at least one carboxy group.

Advantageously, a (any) binder herein disclosed comprises no polyesters, in particular no polyesters comprising at least one carboxy group, other than (A) and where present (B). Advantageously a (any) binder herein disclosed consists essentially of ingredients (A), (C) and where present (B). Advantageously, a (any) binder herein disclosed comprises no other ingredients than (A), (C) and where present (B).

Advantageously a powder coating composition of the invention is a thermosetting powder coating composition. Advantageously a powder coating composition of the invention is suitable for use in food applications, in particular for the coating of food containers.

It is preferred that some of the ingredients used to prepare the powder compositions of the present invention (e.g. the second polyester (B)) are liquids at room temperature as then they are more processable. As used herein room temperature means an indoor temperature from about 20° to about 25° C. (at atmospheric pressure).

Another aspect of the present invention provides a process for coating substrates (such as metal sheets and/or metal containers for food or beverage packaging materials) comprising the steps of:

coating at least one surface of said substrate with the powder coating composition of the present invention; and heating the coated substrate to thermally cure the coating thereon to form an adherent layer of the coating composition on the substrate.

Advantageously, the substrate coated (such as metal sheets and/or metal containers for food and/or beverage packaging materials) are to come into contact with alcohol. Advantageously, at least the interior of a food container that will come into contact with alcohol is coated. More advantageously the substrate coated, more in particular the food container coated, is a metal can (for) holding an alcoholic beverage.

Advantageously the substrate is a metal can or a metal container (for) holding food or beverages (such as alcoholic beverages). More advantageously the substrate is a metal can (for) holding an alcoholic beverage.

A still other aspect of the present invention provides a coated article (such as a coated metal can or container) obtained and/or obtainable by the process of the invention.

Yet another aspect of the invention concerns an article coated—either partly or entirely—with a composition of the invention. Advantageously the article is a metal can, or a metal container, (for) holding food or beverages (such as alcoholic beverages).

Yet another aspect of the invention concerns the use of a (any) powder coating composition of the invention for coating the interior and/or exterior of food containers (e.g. metal cans) coming into contact with alcohol (e.g. where the container holds alcoholic beverages or where alcohol is used to clean or recycle the container before use). The invention in particular provides for the use of a (any) powder coating composition of the invention for coating at least the interior, and possibly also the exterior, of a metal can (for) holding an alcoholic beverage.

Compositions of the present invention are particularly adapted for use on the exterior and interior of food (including beverage) containers (such as cans).

The thermosetting powder coating compositions of the invention can be applied to a metal substrate and cured thereon to form a coating that exhibits excellent flexibility, chemical resistance and is adhered well to the substrate. When coating the interior of a container, coatings of the invention do not adversely affect their contents and may be used in the wide variety of food contact applications as described herein.

First Polyester (A)

Preferred first polyesters ($CO_2H$ functional and amorphous) comprise:

(a) a dicarboxylic acid component comprising (by mole % of total acid)

(i) from 50 to 100 mole % of a first acid selected from isophthalic acid, terephthalic acid and mixtures thereof and (ii) optionally from 0 to 50 mole % of a second acid selected from:

fumaric acid, maleic acid, phthalic anhydride, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, 1,12-dodecanedioic acid, anhydrides thereof; and any mixtures thereof; and (b) a polyol component comprising:
(i) from 70 to 100 mole % of a first alcohol selected from: propyleneglycol, 2-methyl-1,3-propanediol, 2-ethyl-2-butyl-1,3-propanediol, 1-ethyl-2-methyl-1,3-propanediol, 2-ethyl-2-methyl-1,3-propanediol, ethyleneglycol, and diethyleneglycol, used alone or in a mixture,
(ii) optionally from 0 to 30 mole % of further diol(s), preferably selected from 1,4-butanediol, 1,6-hexanediol, 1,4-cyclohexanediol, 1,3-cyclohexanedimethanol, 1,4-cyclohexanedimethanol, hydrogenated Bisphenol A; and mixtures thereof; from
(iii) optionally from 0 to 10 mole % of neopentyl glycol.

The dicarboxylic acid component may comprise at least 60, 65, 70, 75, 80, 82, 85, 90, 95 up to 100 mole % of the first acid(s). In an embodiment the first acid is terephthalic acid, possibly in combination with isophthalic acid. In an embodiment the first acid is comprised of from 80 to 100 mole % terephthalic acid and from 0 to 20 mole % isophthalic acid. In another embodiment the first acid is isophthalic acid, possibly in combination with terephthalic acid.

Advantageously the dicarboxylic acid component consists of 80 to 100 mole % of terephthalic acid and from 0 to 20 mole % isophthalic acid. Advantageously the dicarboxylic acid component consists of terephthalic acid. Advantageously the dicarboxylic acid component consists of isophthalic acid.

Preferably the second acid (a)(ii) (where present) is selected from: fumaric acid, maleic acid, phthalic anhydride, 1,4-cyclohexanedicarboxylic acid, succinic acid, adipic acid, glutaric acid, azelaic acid, sebacic acid, 1,12-dodecanedioic acid, anhydrides thereof; and any mixtures thereof.

Advantageously, the first alcohol (b)(i) is selected from: propyleneglycol, 2-methyl-1,3-propanediol, 2-ethyl-2-butyl-1,3-propanediol, ethyleneglycol, and diethyleneglycol, used alone or in a mixture.

Preferably the first alcohol (b)(i) is selected from propyleneglycol, 2-methyl-1,3-propanediol and/or 2-ethyl-2-butyl-1,3-propanediol; possibly in combination with ethyleneglycol and/or diethyleneglycol. A preferred first alcohol (b)(i) is 2-methyl-1,3-propanediol. Another such preferred alcohol is 2-ethyl-2-butyl-1,3-propanediol. A more preferred such alcohol is propyleneglycol. Advantageously the polyol component consists of propyleneglycol.

Preferably the further diol(s) (b)(ii) (where present) are selected from 1,4-butanediol, 1,6-hexanediol, 1,4-cyclohexanedimethanol; and mixtures thereof. More preferably the further diol(s) are selected from 1,4-butanediol, 1,6-hexanediol, and mixtures thereof. Advantageously the polyol component comprises no further diols (b)(ii). Advantageously the polyol component comprises no NPG.

The first polyester (A) may be linear or branched and may comprise additional components.

Example of additional components: polyacids that comprise at least three carboxy groups, preferably selected from: trimellitic acid, pyromellitic acid and their corresponding anhydrides. Advantageously the first polyester comprises from 0 up to 25 mole %, from 0 up to 20 mole %, from 0 up to 15 mole %, preferably from 1 up to 18 mole %, from 1 up to 15 mole % of a polyacid comprising at least three carboxy groups: preferably selected from: trimellitic acid, pyromellitic acid and their corresponding anhydrides depending on whether the first polyester (A) is branched or anhydride end-capped.

In another or the same embodiment the first polyester (further) comprises one or more trifunctional or tetrafunctional polyols, preferably selected from: trimethylolpropane, ditrimethylolpropane, pentaerythrytol and/or mixtures thereof. Advantageously the first polyester comprises from 0 up to 20 mole %, from 0 to 15 mole %, from 1 up to 18 mole %, from 1 to 15 mole % of one or more trifunctional or tetrafunctional polyols, preferably selected from: trimethylolpropane, ditrimethylolpropane, pentaërythrytol and/or mixtures thereof. Possibly the first polyester comprises no such trifunctional and/or tetrafunctional polyols.

The first polyester (A) may be linear or branched and if branched the acids and/or polyols from which the first polyester is obtained may comprise additional components.

In one embodiment a branched first polyester (A) may be obtained from an acid mixture further comprising:
(a)(iii) up to 15 mole % (relative to the total quantity of first acid (a)(i) and (where present) second acid (a)(ii)) of one or more polyacids that comprise at least three carboxy groups: preferably selected from: trimellitic acid, pyromellitic acid and their corresponding anhydrides. Preferably the first polyester comprises up to 12 mole %, advantageously up to 10 mole % of said polyacids.

Advantageously, when the first polyester (A) is obtained through anhydride endcapping of a hydroxyl functional polyester it may comprise from 0 up to 25 mole % of one or more of such polyacids comprising at least three carboxy groups: preferably selected from: trimellitic acid, pyromellitic acid and their corresponding anhydrides.

It will be understood that to prepare the first polyester the sum of the mole % of the first acid (a)(i), the second acid (a)(ii) and (where present) optional further acids such as the acid mixture (a)(iii); does not exceed 100%, and preferably said mole % total 100%.

In another or the same embodiment a branched first polyester (A) may be obtained from a polyol mixture further comprising:
(b) (iv) up to 15 mole % (relative to the total quantity of first alcohol (b)(i) and (where present) the further glycol (b)(ii) and the NPG (b)(iii)) of one or more trifunctional or tetrafunctional polyols, preferably selected from: trimethylolpropane, ditrimethylolpropane, pentaërythrytol and/or mixtures thereof.

It will be understood that to prepare the first polyester the sum of the mole % of the first alcohol (b)(i), the optional further glycol (b)(ii); the optional NPG (b)(iii) and (where present) optional further polyols such as the polyol mixture (b)(iv); does not exceed 100%, and preferably said mole % total 100%.

More preferred first polyesters (A) exhibit at least one, most preferably all of the following other properties:
an acid number from 15 to 100 mg KOH/g, preferably from 20 to 80 mg KOH/g, more preferably from 25 to 80 mg KOH/g, conveniently from 30 to 70 mg KOH/g;
number averaged molecular weight (measured by gel permeation chromatography (GPC)) from 1100 to 15000, conveniently from 1600 to 8500 daltons,
a glass transition temperature ($T_g$) (measured by Differential Scanning Calorimetry according to ASTM D3418 with a heating gradient of 20° C. per minute) from −50° to 100° C., preferably from 45° to 80° C. and/or
an Brookfield (cone/plate) viscosity (measured at 200° C. according to ASTM D4287-88), from 5 to 15000 mPa·s.

Advantageously, the first polyester comprises at least 50 mole % (by mole % of total acid) of isophthalic acid, more preferably at least 65, at least 70, 75, 80, 82, 85, 90, 95, 96, 97, 98, 99 or even 100 mole % of isophthalic acid, the binder further most preferably comprising the second polyester B.

Advantageously, the first polyester comprises at least 50 mole % (by mole % of total acid) of terephthalic acid, more preferably at least 65, at least 70, 75, 80, 82, 85, 90, 95, 96, 97, 98, 99 or even 100 mole % of terephthalic acid, the binder further optionally comprising the second polyester B.

Second Polyester (B)

Preferred second ($CO_2H$ functional) polyesters (B) comprise:

(a) a dicarboxylic acid component comprising (by mole % of total acid)
  (i) from 75 to 100 mole % of a first acid comprising at least one aliphatic diacid selected from:
    succinic acid, adipic acid, glutaric acid, pimelic acid, suberic acid, azelaic acid, sebacic acid, 1,12-dodecanedioic acid, 1,4-cyclohexanedicarboxylic acid, 1,3-cyclohexanedicarboxylic acid, 1,2-cyclohexane-dicarboxylic acid, anhydrides thereof;
    and/or any mixtures thereof; and
  (ii) optionally from 0 to 25 mole % of a second acid selected from fumaric acid, maleic anhydride, phthalic anhydride, isophthalic acid, terephthalic acid, and any mixtures thereof; and (b) a polyol component comprising:
  (i) from 75 to 100 mole % of a first alcohol selected from:
    a propyleneglycol, 2-methyl-1,3-propanediol, 2-butyl-2-ethyl-1,3-propanediol, 1-ethyl-2-methyl-1,3-propanediol, 2-ethyl-2-methyl-1,3-propanediol, diethyleneglycol; 1,4-cyclohexanediol, 1,4-cyclohexanedimethanol, hydrogenated Bisphenol A; ethyleneglycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, hydroxypivalate of neopentyl glycol, 1,4-cyclohexanediol, 1,4-cyclohexanedimethanol, hydrogenated Bisphenol A; and/or any mixtures thereof; and
  (ii) optionally from 0 to 25 mole % of neopentyl glycol.

Advantageously, the first acid (a)(i) is selected from: succinic acid, adipic acid, glutaric acid, azelaic acid, sebacic acid, 1,12-dodecanedioic acid, 1-4-cyclohexanedicarboxylic acid, anhydrides thereof; and/or any mixtures thereof.

Advantageously, the first alcohol (b)(i) is selected from propyleneglycol, 2-methyl-1,3-propanediol, 2-butyl-2-ethyl-1,3-propanediol, diethyleneglycol, 1,4-cyclohexanedimethanol, ethyleneglycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, hydroxypivalate of neopentyl glycol; and/or any mixtures thereof. Advantageously, the first alcohol is selected from propyleneglycol, 2-methyl-1,3-propanediol, 2-butyl-2-ethyl-1,3-propanediol, diethyleneglycol, 1,4-cyclohexanedimethanol, ethyleneglycol, 1,4-butanediol, 1,6-hexanediol; and/or any mixtures thereof. Preferably the first alcohol is selected from propyleneglycol, 2-methyl-1,3-propanediol and/or 2-butyl-2-ethyl-1,3-propanediol; possibly in combination with ethyleneglycol and/or diethyleneglycol. A preferred first alcohol is 2-methyl-1,3-propanediol. Another such preferred alcohol is 2-ethyl-2-butyl-1,3-propanediol. More preferably the first alcohol is propyleneglycol. Advantageously the polyol component comprises no NPG.

The second polyester advantageously is amorphous.

It will be understood that to prepare the second polyester the sum of the mole % of the first acid (a)(i), the second acid (a)(ii) and (where present) optional further acids; does not exceed 100%, and preferably said mole % total 100%.

It will be understood that to prepare the second polyester the sum of the mole % of the first alcohol (b)(i), and (where present) the NPG(b)(ii); does not exceed 100%, and preferably said mole % total 100%. The second polyester can comprise further polyols (b)(iii) and in said case, the sum of the mole % of the first alcohol (b)(i), (where present) the NPG(b)(ii) and the further polyols (b)(iii); does not exceed 100%, and preferably said mole % total 100%.

The second polyester (B) may be linear or branched and may comprise additional components.

Example of further acids: polyacids that comprise at least three carboxy groups, preferably selected from: trimellitic acid, pyromellitic acid and their corresponding anhydrides. Advantageously the second polyester comprises from 0 up to 25 mole %, from 0 up to 20 mole %, from 0 up to 15 mole %, preferably from 1 up to 18 mole %, from 1 up to 15 mole % of a polyacid comprising at least three carboxy groups: preferably selected from: trimellitic acid, pyromellitic acid and their corresponding anhydrides.

The second polyester (B) may be linear or branched and if branched the acids and/or polyols from which the second polyester is obtained may comprise additional components such as independently those additional acids and/or polyols (and independent present in up to the same amounts) as described herein to obtain branched first polyesters (A)).

More preferred second polyesters (B) exhibit at least one, most preferably all of the following other properties:
  an acid number from 10 to 100 mg KOH/g, conveniently from 15 to 80 mg KOH/g;
  number averaged molecular weight (measured by gel permeation chromatography (GPC)) from 1100 to 17000, conveniently from 1400 to 11500 daltons,
  a glass transition temperature (Tg) (measured by Differential Scanning Calorimetry according to ASTM D3418 with a heating gradient of 20° C. per minute) from −100° to 50° C., preferably from −50° to 25° C., more preferably from −50° C. to 0° C. and/or
  a Brookfield (cone/plate) viscosity (measured according to ASTM D4287-88), from 5 mPa·s measured at 100° C. to 20000 mPa·s measured at 200° C.

It is preferred that the second polyester is liquid at room temperature to aid processability. Preferably the second polyester is obtained from a linear aliphatic diacid. Advantageously the second polyester is obtained from a non linear aliphatic diol. More preferably the second polyester is obtained from a linear aliphatic diacid and a non linear aliphatic diol.

Polyester Blend

In preferred thermosetting powder compositions of the invention the polyester component comprises:
  from 55 to 100 parts, more preferably 70 to 95 parts, by weight of the first polyester (A); together with
  0 to 45 parts, more preferably 5 to 30 parts, by weight of the second polyester (B).

A thermosetting polyester blend of the invention can be obtained by blending the first and second polyesters (A) and (B) in the melt using the conventional cylindrical double-walled reactor.

Preparing Polyesters

The first and second polyesters may be prepared using conventional esterification techniques well known in the art. The polyesters may be prepared according to a procedure consisting of one or more reaction steps.

For the preparation of these polyesters, a conventional reactor equipped with a stirrer, an inert gas (nitrogen) inlet, a thermocouple, a distillation column connected to a water-cooled condenser, a water separator and a vacuum connection tube is used. Polyesterification is generally carried out, in the presence of an esterification catalyst such as n-butyl tintrioctoate, at a temperature which is gradually increased from 130° C. to about 190° C. to 250° C., first under normal pressure, then, when necessary, under reduced pressure at the end of each process step, while maintaining these operating conditions until a polyester is obtained of the desired hydroxyl and/or acid number. The degree of esterification is followed by determining the amount of water formed in the course of the reaction and the properties of the obtained polyester, for example the hydroxyl number, the acid number, the molecular weight or the viscosity.

Alternatively, in order to have a fast temperature increase at the initiation of each process step and in order to reduce losses of polyacid or polyol components, the polyesterification can be performed or initiated under a pressure higher than the normal one (e.g. 2-3 bar). A reduced pressure can then be applied when necessary at the end of each process step. Such reaction conditions are particularly useful when terephthalic acid and propyleneglycol are part of the polyacids and polyols respectively.

When polyesterification is complete, crosslinking catalysts, such as hexadecyl trimethyl ammonium bromide, can optionally be added to the polyester while it is still in the molten state. These catalysts are added in order to accelerate crosslinking of the thermosetting powder composition during curing.

Curing Agent

Thermosetting powder binders of the present invention also comprise a curing agent.

Preferred curing agents (having functional groups reactive with the carboxy functional first and second polyesters) comprise polyepoxy compounds.

More preferred curing agents comprise β-hydroxyalkylamide or compounds comprising groups derived from β-hydroxyalkylamide.

Conveniently the curing agents may be selected from any of the following and mixtures thereof:

polyepoxy compounds that are solid at room temperature and comprise at least two epoxy groups per molecule, such as triglycidyl isocyanurate for example as available commercially from Ciba under the trade names Araldite PT810 and Araldite PT910 (epoxy resin);

acrylic copolymers comprising glycidyl groups such as those obtained from glycidyl methacrylate and/or glycidyl acrylate and from (meth)acrylic monomer and, optionally, an ethylenically mono-unsaturated monomer different from glycidyl (meth)acrylate or from the (meth)acrylic monomer. Examples of this acrylic copolymer are available commercially from Estron Chemical Inc under the trade designation GMA300 and are also described in WO 91/01748; and/or β-hydroxyalkylamides which comprise at least one, preferably two bis(β-hydroxyalkyl)amide groups, for example as described in U.S. Pat. Nos. 4,727,111, 4,788,255, 4,076, 917, EP 322834-A and/or EP 473380-A.

Usefully the curing agent is present in compositions of the invention in an amount so the ratio of total carboxy equivalents in the first polyester (and where present second polyester) to the total equivalents of epoxy and/or β-hydroxyalkyl groups in the curing agent is from 0.25 to 1.40, more usefully from 0.60 to 1.05.

Binder

Preferred thermosetting powder binders of the invention comprise:

(A) from 19.0 to 99.0 parts (more preferably 24.5 to 95.5 parts) by weight of the first polyester;

(B) from 44.5 to 0 parts (more preferably 30.0 to 1.5 parts) by weight of the second polyester; and (C) from 1 to 65 parts (more preferably 3 to 50 parts) by weight of a curing agent having functional groups being reactive with the carboxy groups of the polyesters;

all parts being based on the total weight of polyester resins and curing agents.

It will be understood that to prepare the binder the sum of the weight percentages of (A), (B) and (C) does not exceed 100%, and advantageously said sum totals 100%.

Powder Formulations

The first and (optional) second polyesters may be formulated with other conventional ingredients and a suitable combination of hardeners to prepare powder coating compositions suitable for use as paint or clear lacquer. Preferably the other ingredients are also suitable for food contact applications.

In addition to the essential components described above, powder coating compositions of the present invention can also comprise other ingredients well known to those in the art. Preferably such other ingredients are also suitable for food contact applications.

For example powder compositions of the invention may additionally comprise: flow control agents such as that available commercially from Cytec under the trade mark Modaflow P6000; and degassing agents such as benzoin (available commercially from BASF).

Powders of the present invention may comprise colorants or may be clear lacquers. A variety of dyes and pigments can be utilised in the composition of this invention. Examples of useful pigments and dyes are: metallic oxides such as titanium dioxide, iron oxide, zinc oxide and the like, metal hydroxides, metal powders, sulphides, sulphates, carbonates, silicates such as ammonium silicate, carbon black, talc, china clay, barytes, iron blues, leadblues, organic reds, organic maroons and the like.

Blending

The components of the powder compositions of the invention may be mixed by any well known suitable means. For example they may be dry blended in a mixer or blender (e.g. drum mixer). The premix can then be homogenised at temperatures ranging from 70 to 150° C. in a single screw extruder such as the BUSS-Ko-Kneter or a double screw extruder such as the PRISM or APV. The extrudate, when cooled down, can be ground to a powder with a particle size ranging from 10 to 150 μm.

Coating

The powdered composition may be deposed on the substrate by use of a powder gun such as an electrostatic CORONA gun or TRIBO gun, or other well known methods of powder deposition such as the fluidised bed technique can be used. After deposition the powder is heated to a temperature between 140 and 250° C., causing the particles to flow and fuse together to form a smooth, uniform, continuous, uncratered coating on the substrate surface.

Many other variations embodiments of the invention will be apparent to those skilled in the art and such variations are contemplated within the broad scope of the present invention. Further embodiments, aspects of the invention and preferred features thereof are given in the claims herein. It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

Other conventional terminology and ingredients used in powder compositions are well known to those skilled in the art for example in "Powder Coatings—Chemistry and technology, T. A. Misev, 1991 J. Wiley & Sons Ltd", the contents of which are incorporated here by reference especially passages 42 to 82, 131 to 162 and 224 to 284.

EXAMPLES

The present invention will now be described in detail with reference to the following non limiting examples which are by way of illustration only.

Example 1: Synthesis of a Carboxylic Acid Group Containing Amorphous Polyester (A)

Propyleneglycol (347.14 parts) are placed in a conventional four neck round bottom flask equipped with a stirrer, a distillation column connected to a water cooled condenser, an inlet for nitrogen and a thermometer attached to a thermoregulator.

The flask contents are heated, while stirring under nitrogen, to a temperature of circa 130° C. at which point 760.35 parts of isophthalic acid, 45.67 parts of trimellitic anhydride and 2.00 parts of n-butyltintrioctoate are added. The heating is continued gradually to a temperature of 230° C. Water is distilled from the reactor from 180° C. on. When distillation under atmospheric pressure stops, a vacuum of 50 mm Hg is gradually applied. After three hours at 230° C. and 50 mm Hg, following characteristics are obtained:

| AN | 46.4 mg KOH/g |
|---|---|
| Brfld$^{175°\ C.}$ (cone/plate) | 7590 mPa · s |
| Tg (DSC, 20°/min) | 70° C. |

Example 2: Synthesis of a Carboxylic Acid Group Containing Amorphous Polyester (A)

2-Ethyl 2-butyl 1,3-propanediol (504.16 parts), terephthalic acid (471.22 parts) of and of n-butyltintrioctoate (2.00 parts) were charged to a reaction vessel, in the same manner as described in Example 1. The temperature of the reaction mixture was gradually increased to 220° C. under a nitrogen atmosphere. The mixture was stirred and held at 220° C. until an acid value of below 5 mg KOH/g was obtained. The reaction mixture was then cooled to 170-190° C. followed by the addition of 118.92 parts of trimellitic anhydride. The temperature was maintained for about two hours until a polyester with following characteristics was obtained:

| AN | 73.5 mg KOH/g |
|---|---|
| Brfld$^{175°\ C.}$ (cone/plate) | 5590 mPa · s |
| Tg (DSC, 20°/min) | 57° C. |

Example 3: Synthesis of a Carboxylic Acid Group Containing Amorphous Polyester (B)

According to the procedure described in Example 1, 397.34 parts of propyleneglycol, 764.86 parts of adipic acid, 21.20 parts of trimellitic anhydride and 2.00 parts of n-butyltintrioctoate are put into reaction until a polyester with following characteristics is obtained:

| AN | 22.2 mg KOH/g |
|---|---|
| Brfld$^{100°\ C.}$ (cone/plate) | 1100 mPa · s |
| Tg (DSC, 20°/min) | −45° C. |

Examples 4 to 7: Synthesis of Amorphous Polyester (A)

According to the procedure of examples 1 the polyesters of examples 4, 5 and 7, having the compositions as in table 1, were prepared. On the other hand, the polyester of example 6 was prepared accordingly the procedure of example 2.

For all the examples of table 1, 2.00 parts of n-butyltintrioctoate were introduced as the polycondensation catalyst.

TABLE 1

|  | Ex. 4 | Ex. 5 | Ex. 6 | Ex. 7 |
|---|---|---|---|---|
| Terephthalic Acid | 378.65 |  | 560.78 | 549.87 |
| Isophthalic Acid | 163.52 | 786.29 |  | 90.28 |
| Trimellitic Anhydride | 46.93 | 18.84 | 105.28 | 17.58 |
| 2-Ethyl 2-Butyl 1,3-Propanediol | 521.86 |  |  |  |
| Propyleneglycol |  | 355.18 |  |  |
| 2-Methyl 1,3-Propanediol |  |  | 300.54 | 342.27 |
| Diethylene glycol |  |  | 33.39 |  |
| AN, mg KOH/g | 48.2 | 29.2 | 69 | 28.5 |
| Brookfield viscosity, mPa · s | 5130$^{(200°\ C.)}$ | 9800$^{(175°\ C.)}$ | 7250$^{(175°\ C.)}$ | 6600$^{(200°\ C.)}$ |
| Tg (DSC: 20° C./min) | 55 | 74 | 52 | 49 |

The polyester of example 1 and 2 and 4 to 7 are then formulated to a powder accordingly to the white paint formulation as mentioned below.

White Paint Formulation

| Binder | 69.06 |
|---|---|
| Kronos 2310 | 29.60 |
| Modaflow P6000 | 0.99 |
| Benzoin | 0.35 |

The powders are prepared first by dry blending of the different components and then by homogenisation in the melt using a PRISM 16 mm L/D 15/1 twin screw extruder at an extrusion temperature of 85° C. The homogenised mix is then cooled and ground in an Alpine. Subsequently the powder is sieved to obtain a particle size between 10 and 110 μm. The powder thus obtained is deposited on cold rolled steel with a thickness of 0.5 mm, and aluminium panels with a thickness of 0.6 mm, by electrostatic deposition using the GEMA—Volstatic PCG 1 spray gun. At a film thickness of about 30 μm, the panels are transferred to an air-ventilated oven, where curing proceeds for a 18 minutes at a temperature of 200° C. The paint characteristics for the finished coatings obtained from the different amorphous polyesters (A) optionally combined with the amorphous polyester (B) of Example 3, as illustrated in this invention, are reproduced in the table 2 and table 3.

In these tables:

Column 1 and 8: indicate the identification number of the formulation

Column 2: indicates the type (example) and weight percentage of the amorphous polyester (A) relative to the total amount of polyester (A)+(B)

Column 3: indicates the type (example) and weight percentage of the polyester (B) relative to the total amount of polyester (A)+(B)

Column 4: indicates the weight percentage of resins (A) & (B) present in the binder Column 5: indicates the type of the hardener having functional groups being reactive with the polyesters' (A) and (B) carboxylic acid groups where:
  GT7004=Bisphenol-A type epoxy-resin, type n=3 (Huntsman)
  XL552=Primid XL552 (EMS)=N,N,N',N'-tetrakis-(2-hydroxyethyl)-adipamide Column 6: indicates the weight percentage of the hardener present in the binder Column 7: indicates the 60° gloss, measured according to ASTM D523

Column 9: indicates the direct/reverse impact strength according to ASTM D2794. The highest impact which does not crack the coating is recorded in kg·cm.

Column 10: indicates the Erichsen slow embossing according to ISO 1520. The highest penetration which does not crack the coating is recorded in mm.

Column 11: indicates the weight percentage of crosslinking catalyst (hexadecyltrimethylammonium bromide) relative to the binder (=(A)+(B)+Hardener)

Column 12: indicates the number of twofold rubbing movements (to and fro) with a cotton pad impregnated with MEK, which does not detrimentally affect the appearance of the surface of the cured film. The pressure applied is as when erasing a pencil mark with a pencil eraser.

Column 13: classification value for the cross-cut adhesion on cold rolled steel and aluminium respectively, by tape test according to ASTM D3359 according to which
  5B: the edges of the cuts are completely smooth; none of the squares of the lattice is detached
  4B: small flakes of the coating are detached at intersections; less than 5% of the area is affected
  3B: small flakes of the coating are detached along edges and at intersections of cuts; the area affected is 5 to 15% of the lattice
  2B: the coating has flaked along the edges and on parts of the squares; the area affected is 15 to 35% of the lattice
  1B: the coating has flaked along the edges of cuts in large ribbons and whole squares have detached; the area affected is 35 to 65% of the lattice
  0B: flaking and detachment worse than grade 1

TABLE 2

| Powder | polyester (A) | polyester (B) | % A + B | Hardener | % Hardener | Gloss 60° |
|---|---|---|---|---|---|---|
| Example 8 | Ex. 1-100 | | 91 | XL552 | 9 | 96 |
| Example 9 | Ex. 1-100 | | 60 | GT7004 | 40 | 96 |
| Example 10 | Ex. 2-100 | | 50 | GT7004 | 50 | 94 |
| Example 11 | Ex. 4-100 | | 91 | XL552 | 9 | 93 |
| Example 12 | Ex. 4-100 | | 60 | GT7004 | 40 | 98 |
| Example 13 | Ex. 5-100 | | 95 | XL552 | 5 | 97 |
| Example 14 | Ex. 5-95 | Ex. 3-5 | 95 | XL552 | 5 | 94 |
| Example 15 | Ex. 6-100 | | 50 | GT7004 | 50 | 93 |
| Example 16 | Ex. 7-100 | | 70 | GT7004 | 30 | 96 |

TABLE 3

| Powder | DI/RI (kg · cm) | Erichsen (mm) | % crosslinking catalyst | MEK resistance | Adhesion Al/Steel |
|---|---|---|---|---|---|
| Example 8 | 160/160 | 8.4 | | 100 | 5B/5B |
| Example 9 | 180/200 | 8.7 | 0.3 | 120 | 5B/5B |
| Example 10 | 200/200 | 8.8 | 0.3 | 150 | 5B/5B |
| Example 11 | 200/200 | 9.0 | | 110 | 5B/5B |
| Example 12 | 200/200 | 8.7 | 0.3 | 130 | 5B/5B |
| Example 13 | 120/140 | 8.3 | | 100 | 4B/4B |
| Example 14 | 200/200 | 8.5 | | 100 | 5B/5B |
| Example 15 | 180/180 | 8.4 | 0.3 | 140 | 5B/4B |
| Example 16 | 200/180 | 8.6 | 0.3 | 120 | 5B/5B |

The invention claimed is:

1. A powder coating composition comprising a binder and 0 mole % of neopentyl glycol, wherein the binder consists of a mixture of:
  (A) a first polyester that is amorphous and comprises at least one carboxy group; the first polyester having an acid number from 15 to 100 mg KOH/g, a glass transition temperature (Tg) from 45° C. to 80° C. and a viscosity from 5 to 15000 mPa·s, said first polyester being obtained from:
  an acid component comprising:
  (a) a dicarboxylic acid component consisting of isophthalic acid, terephthalic acid and mixtures thereof; and
  (c) from 1 up to 18 mole % of polyacids comprising at least three carboxy groups; and
  a polyol component (b) consisting of propylene glycol;
  (b) a polyol component consisting of propylene glycol; and
  (B) optionally a second polyester that is amorphous and that comprises at least one carboxy group; the second polyester being obtained from an aliphatic diacid and an aliphatic diol, and
  (C) a curing agent that comprises functional groups reactable with carboxylic acid groups on the polyester(s) (A) and (B), which is at least one selected from the group consisting of an epoxy resin and a β-hydroxyalkylamide hardener, wherein the binder consists essentially of amorphous polyesters.

2. The composition according to claim 1, in which the first polyester (A) has an acid number from 20 to 80 mg KOH/g.

3. The composition according to claim 1, wherein the binder consists of a mixture of said first polyester (A), said second polyester (B) and said curing agent (C).

4. The composition according to claim 1, in which the dicarboxylic acid component (a) is terephthalic acid, optionally in combination with isophthalic acid.

5. The composition according to claim 1, in which the dicarboxylic acid component (a) is isophthalic acid.

6. The composition according to claim 1, in which the second polyester (B) is obtained from:
  (a) a dicarboxylic acid component comprising, by mole % of total acid,
    (i) from 75 to 100 mole % of a first acid comprising at least one linear non-branched aliphatic diacid selected from the group consisting of:
    succinic acid, adipic acid, glutaric acid, pimelic acid, suberic acid, azelaic acid, sebacic acid, 1,12-dodecanedioic acid, 1,4-cyclohexanedicarboxylic acid, 1,3-cyclohexanedicarboxylic acid, 1,2-cyclohexanedicarboxylic acid anhydrides thereof, and any mixtures thereof; and (ii) optionally from 0 to 25 mole % of a second acid selected from the group consisting of fumaric acid, maleic anhydride, phthalic anhydride, isophthalic acid, terephthalic acid, and any mixtures thereof; and (b) a polyol component comprising:

an alcohol selected from the group consisting of:
propyleneglycol, 2-methyl-1,3-propanediol, 2-butyl-2-ethyl-1,3-propanediol, 1-ethyl-2-methyl-1,3-propanediol, 2-ethyl-2-methyl-1,3-propanediol, diethyleneglycol; 1,4-cyclohexanediol, 1,4-cyclohexanedimethanol, hydrogenated Bisphenol A; ethyleneglycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, hydroxypivalate of neopentyl glycol, 1,4-cyclohexanediol, 1,4-cyclohexanedimethanol, hydrogenated Bisphenol A, and any mixtures thereof.

7. The composition according to claim 1, in which the first and/or second polyester is branched.

8. The composition according to claim 1, wherein the powder coating composition is a thermosetting powder coating composition comprising a binder system consisting of from 19 to 99 parts by weight of polyester (A), from 0 to 44.5 parts by weight of polyester (B), and from 1 to 65 parts by weight of the curing agent (C), wherein polyester (B) has a Tg of less than or equal to 50° C. and which comprises with respect to a total amount of acids, from 75 to 100 mol % of an aliphatic diacid and, with respect to a total amount of alcohols, from 75 to 100 mol % of an aliphatic diol different from neopentyl glycol.

9. The composition according to claim 1, wherein the binder consists of:

(A) from 19.0 to 99.0 parts by weight of the first polyester;

(B) from 44.5 to 0 parts by weight of the second polyester; and (C) from 1 to 65 parts by weight of the curing agent, all parts being based on a total weight of polyester resins and curing agents.

10. The composition according to claim 1, wherein the binder consists of:

(A) from 24.5 to 95.5 parts by weight of the first polyester;

(B) from 30.0 to 1.5 parts by weight of the second polyester; and (C) from 3 to 50 parts by weight of the curing agent, all parts being based on a total weight of polyester resins and curing agents.

11. The composition according to claim 1, wherein the polyacids (c) comprising at least three carboxy groups are selected from the group consisting of trimellitic acid, pyromellitic acid and their corresponding anhydrides.

12. The composition according to claim 1, wherein the binder consists of a mixture of the first polyester (A) and the curing agent (C).

13. A coated article obtained by a process comprising the steps of coating at least one surface of a substrate with the powder coating composition according to claim 1; and heating the coated substrate to thermally cure the coating thereon to form an adherent layer of the coating composition on the substrate.

14. The article according to claim 13, wherein the substrate is a metal can holding an alcoholic beverage.

15. The article according to claim 13, wherein the substrate is selected from metal sheets for food and/or beverage products.

16. The article according to claim 13, wherein the substrate is selected from metal containers for food and/or for beverage products.

17. The article according to claim 13, wherein an interior and/or exterior surface of the substrate are coated, and wherein the substrate is a food container coming into contact with alcohol.

18. The article according to claim 13, wherein at least an interior surface of the substrate is coated, and wherein the substrate is a metal can for holding an alcoholic beverage.

19. A process for coating substrates comprising the steps of coating at least one surface of a substrate with a powder coating composition according to claim 1; and heating the coated substrate to thermally cure the coating thereon to form an adherent layer of the coating composition on the substrate.

20. The process according to claim 19 wherein the substrate is selected from metal sheets for food and/or beverage products.

21. The process according to claim 19 wherein the substrate is selected from metal containers for food and/or for beverage products.

22. The process according to claim 19, wherein the interior and/or exterior of a food container coming into contact with alcohol is coated.

23. A powder coating composition comprising a binder and 0 mole % of neopentyl glycol, wherein the binder consists of a mixture of:

(A) a first polyester that is amorphous and comprises at least one carboxy group; the first polyester having an acid number from 15 to 100 mg KOH/g, a glass transition temperature (Tg) from 45° C. to 80° C. and a viscosity from 5 to 15000 mPa.s, said first polyester being obtained from an acid component and a polyol component wherein:

the acid component consists of:

(a) a dicarboxylic acid component consisting of isophthalic acid, terephthalic acid and mixtures thereof; and (b) from 1 up to 18 mole% of polyacids comprising at least three carboxy groups; and the polyol component consists of propylene glycol;

(B) optionally a second polyester that is amorphous and that comprises at least one carboxy group; the second polyester being obtained from an aliphatic diacid and an aliphatic diol, and (C) a curing agent that comprises functional groups reactable with carboxylic acid groups on the polyester(s) (A) and (B), which is at least one selected from the group consisting of an epoxy resin and a β-hydroxyalkylamide hardener, wherein the binder consists essentially of amorphous polyesters.

* * * * *